United States Patent

Karstensen et al.

[11] 4,075,562
[45] Feb. 21, 1978

[54] SPEED SENSOR MOUNTING FOR A GAS TURBINE

[75] Inventors: Karl W. Karstensen; Brace C. Smith, both of Peoria, Ill.

[73] Assignee: Caterpillar Tractor Co., Peoria, Ill.

[21] Appl. No.: 728,588

[22] Filed: Oct. 1, 1976

[51] Int. Cl.$^2$ .............................................. G01P 3/48
[52] U.S. Cl. .................................. 324/173; 60/39.31
[58] Field of Search ................. 324/173; 73/231, 71.4; 60/39.31

[56] References Cited

U.S. PATENT DOCUMENTS

| | | | |
|---|---|---|---|
| 3,776,027 | 12/1973 | Campbell | 73/71.4 X |
| 3,835,696 | 9/1974 | Amberger et al. | 73/71.4 X |

Primary Examiner—Rudolph V. Rolinec
Assistant Examiner—Vincent J. Sunderdick
Attorney, Agent, or Firm—Phillips, Moore, Weissenberger, Lempio & Majestic

[57] ABSTRACT

A speed sensor mounting assembly for a gas turbine speed sensor insures a magnetic speed sensing device is positioned a predetermined distance from a toothed wheel mounted on the output shaft of the gas turbine. The magnetic speed sensing device, which may be of conventional manufacture, is affixed in a fitting located at one end of a flexible conduit which extends outwardly from the vicinity of the shaft to an access port in the engine casing. The use of the flexible conduit allows remote rotation of the fitting and sensing device to threadably engage the fitting with a socket affixed to the engine adjacent the output shaft. Electrical conductor leads are contained in the flexible conduit for interconnection of the sensing device and appropriate electronic circuitry.

9 Claims, 5 Drawing Figures

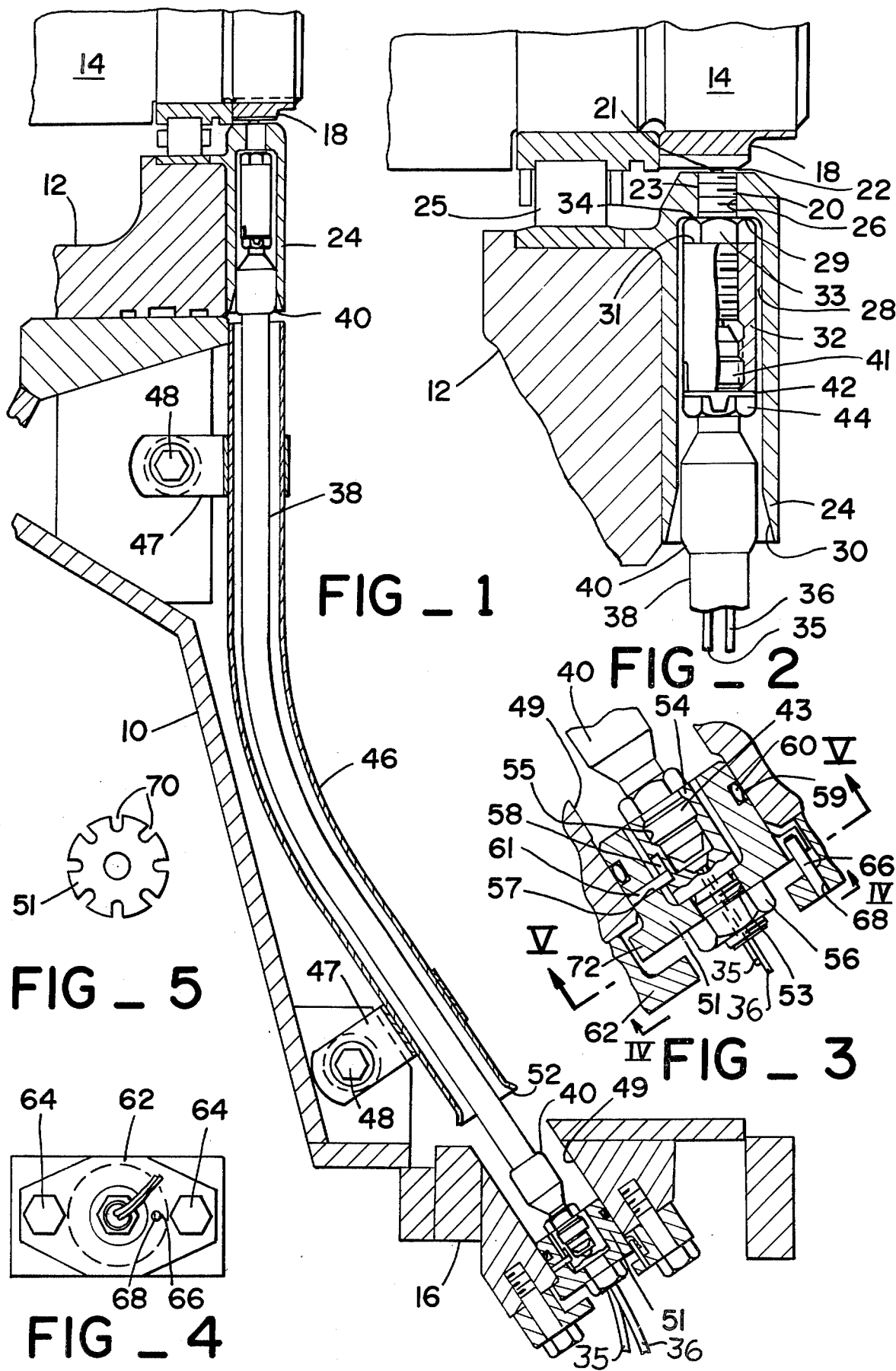

SPEED SENSOR MOUNTING FOR A GAS TURBINE

BACKGROUND OF THE INVENTION

This invention relates to the positioning and installation of a turbine speed sensor device in a gas turbine engine. It particularly relates to the installation of such a device in a gas turbine engine wherein installation is difficult or not accessible via a straight line from an appropriately located access port on the outer case of the engine.

Gas turbine engines, in common with all engines, require some means for sensing the speed of the output shaft. Such speed sensing is important for several reasons. First, it provides an input to a power output indicator and secondly it assists in control of the engine. For example, a speed sensing device such as envisioned in this invention is capable of detecting a rapid increase in turbine speed resulting from mechanical failure in a gear train which the turbine may be driving. Such a loss of gear teeth in a load can result in explosive termination of engine operation because of the high speeds inherent in gas turbine operations. Consequently, early sensing of a rapid increase in output shaft speed which may be a portent of engine failure is of great importance to prevent destructive turbine overspeeds. Sensing of such an overspeed may be programmed to result in automatic shut off of the fuel supply to the engine.

The design of a gas turbine quite frequently precludes installation of speed sensing devices in the vicinity of the output shaft because of cramped conditions. It should be apparent to those familiar with the gas turbine art that the mechanical method often utilized in internal combustion reciprocating engines wherein a toothed wheel is placed on the drive shaft to drive a tachometer cable which in turn operates a dial type speed indicating device is not acceptable in a gas turbine because of high shaft speeds. Consequently, some other method of speed sensing is necessary. A particularly suitable method includes the positioning of a permanent magnet in the vicinity of a ferromagnetic toothed or rigid wheel or shaft. The permanent magnet carries thereabout a coil with appropriate leads which may be affixed to an electronic device. Rotation of the toothed wheel influences the magnetic field of the permanent magnet thus generating a current in the coil wrapped about the magnet. The current generated in the coil is transmitted to a sensing device which converts voltage fluctuations into a shaft output speed. Such electronic computation is possible because the frequency of voltage fluctuations is directly proportional to the speed of rotation of the shaft. A critical aspect of the use of such magnetic speed sensing device is the positioning of the device at a proper predetermined distance from the toothed or rigid wheel. When access is readily available to the toothed wheel the positioning of such a speed sensing device presents little or no problem. However, in certain gas turbine engines such access is not readily available and therefore the positioning of a small speed sensing device such as is envisioned in this application becomes extremely difficult. It is most advantageous to be able to position the speed sensing device from the exterior of the engine casing and insure that each such installation would locate the speed sensing device at the predetermined distance from a toothed wheel mounted on an output shaft.

SUMMARY OF THE INVENTION

Accordingly, this invention provides a means for mounting a turbine speed sensing device in close proximity to the output shaft of a gas turbine. Specifically, the invention applies to any engine or rotating machinery wherein access to the output shaft is limited by the casing construction precluding straight line access from an appropriately located access port on the outer case of the engine or machine. The construction disclosed herein provides a flexible conduit having mounted at one end a magnetic sensor and at the other opposite end a specially formed fitting adapted to be fixedly associated with the outer casing of the engine. The flexible conduit means is itself passed through a rigid non-linear conduit so that the magnetic sensor is led directly into a socket mounted in the vicinity of the output shaft. With the magnetic sensor in the vicinity of the output shaft the flexible conduit may be rotated to threadably engage the sensor with the socket. The sensor is affixed to the end of the flexible conduit by a special fitting insuring that the critical air gap between the sensor and the tips of the teeth of a rotating member on the shaft is maintained. Provision is included at the other opposite end of the flexible shaft in the specially formed fitting to insure the conduit once installed is not permitted to rotate. Electrical leads pass from the sensor through the center of the flexible conduit to the outer side of the engine casing. Advantages found in this system, in addition to those already enumerated, include the utilization of conventional wire braid reinforced hydraulic hose for the purpose of forming the flexible conduit. Affixed at either end of the hydraulic hose is a conventional hydraulic fitting. The utilization of wire braid hydraulic hose serves two purposes, the first being to provide a flexible conduit which permits remote rotation of the sensor for threadable installation thereof, and the second being to insure a relatively contaminant free environment for the electrical leads contained in the conduit.

It is an object of this invention to provide a means for mounting a speed sensor in the vicinity of a rotating shaft.

It is a further object of this invention to mount the aforesaid speed sensor in the vicinity of an output shaft in rotating machinery or gas turbine engine.

It is a further object of this invention to provide a mounting means for a speed sensor in rotating machinery or a gas turbine engine so that the speed sensor may be positioned in the vicinity of the output shaft from a position remote thereof.

It is still another object of this invention to provide a mounting means for a speed sensor in a gas turbine engine which has a protective cover for electrical conduits leading outwardly from the output shaft.

Broadly stated the invention is a speed sensor mounting for a gas turbine engine, the gas turbine engine having an output shaft mounted in a casing with a toothed gear mounted on the output shaft. The speed sensor is a magnetic device responsive to rotation of the toothed gear on the output shaft so that a fluctuating voltage is generated whose frequency varies in direct proportion to the speed of rotation of the output shaft. The sensor is mounted in a speed sensor mounting assembly comprising a bored fitting means for lockingly threadingly receiving the magnetic device so that the magnetic device partially extends from a first end of the mounting assembly a predetermined distance and forms a stepped juncture with the mounting assembly. Electrical conductor means are interconnected with the magnetic device to conduct the fluctuating voltage therefrom. Socket means are rigidly affixed to the turbine casing in the vicinity of the toothed gear, the socket means defines a threaded radial bore proximate the turbine shaft and a counterbore extending outwardly therefrom. The counterbore is adapted to slidably receive the threadably bored fitting means allowing the extending portion of the magnetic device to be threadably received in the threaded radial bore of the socket means. Flexible conduit means removably and lockably affixed to the fitting means protect the electrical conductors and allow for rotation of the fitting means in the socket means from a remote position. Also included are mounting means associatable with the flexible conduit means for fixing the flexible conduit means relative to the engine casing.

These and other objects of the invention will become apparent from a study of the accompanying drawings and the following specification.

BRIEF DESCRIPTION OF THE DRAWINGS

FIG. 1 is the mounting assembly partly in section mounted in a representative gas turbine engine;

FIG. 2 is a detail of the sensor end portion of the mounting assembly illustrated in FIG. 1;

FIG. 3 is a detail of the mounting means utilized in the engine casing to secure the flexible conduit from rotation.

FIG. 4 is a plan view of the mounting means illustrated in FIG. 3; taken at line IV—IV.

FIG. 5 is an end view of the mounting means shown in FIG. 3 taken at line V—V.

DETAILED DESCRIPTION OF THE PREFERRED EMBODIMENT

A portion of a gas turbine engine is shown in FIG. 1 which is representative of the type of gas turbine engines in which the speed sensor mounting assembly disclosed herein is particularly adaptable. The turbine housing 10 has mounted therein a bearing assembly 12. Bearing assembly 12 rotatably affixes a turbine output shaft 14, only a portion of which is shown in FIG. 1, in the turbine housing. The turbine housing is encompassed by a casing 16. Components of the remainder of the turbine engine and an associated reduction gear assembly are not herein shown but such components may preclude access to turbine output shaft 14 without disassembly for the purpose of mounting a speed sensor. Turbine output shaft 14 has unitarily formed therewith a toothed or rigid nut 18 having axial grooves defined therein. It is well-known in the art that a magnetic coil formed about a permanent magnet which is positioned in the vicinity of a rotating irregular metal body such as toothed nut 18 will have a fluctuating current induced therein so that the resulting fluctuating voltage in the coil may be measured by appropriate electrical measurement means. The current is induced in such a coil by the influence of the toothed nut passing through the magnetic field causing the field to change in shape so that the flux lines cut the conductors of the electric coil. Such magnetic sensors as heretofore described are commercially available.

Referring to FIG. 2, a magnetic sensor 20 of the type described is shown in the vicinity of toothed nut 18. The placement of magnetic sensor 20 in the vicinity of toothed nut 18 is critical, as the air gap 22 therebetween is important to the proper operation of the sensor. Accordingly, bearing assembly 12 has affixed thereto a socket means 24 which may take the form of an annular type ring affixed to bearing assembly 12 by appropriate means such as bolts. Socket means 24 may in addition to providing a mounting for magnetic sensor 20 provide oil passages to roller bearing 25 which rotatably mounts shaft 14 in bearing assembly 12. None of the oil passages just described are illustrated in either FIG. 1 or FIG. 2, nor do they constitute a portion of this invention. Socket means 24 defines a radial bore 26 proximate toothed nut 18 and a counterbore 28 extending radially outwardly from radial bore 26. Counterbore 28 and radial bore 26 form a shoulder 29 a predetermined distance outward from toothed nut 18. The outer end of counterbore 28 is flared outwardly forming a frustoconical surface 30, the purpose of which will become more apparent.

Magnetic sensor 20 is cylindrical in form and is threaded on outer surface 23. A magnetic tip 21 extends from one end of the magnetic sensor. Radial bore 26 is similarly threaded and is adapted to receive the threaded surface of magnetic sensor 20 so that tip 21 extends toward toothed nut 18. Magnetic sensor 20 is, however, first threadably received in a threadably bored fitting means such as sleeve 32. Sleeve 32 is of diameter sufficiently small to be slidably received in the counterbore 28 but of sufficiently large diameter to be prevented from passing shoulder 29 and thus through radial bore 26. Also threadably affixed to magnetic sensor 20 is a locking means in the form of a lock nut 33 which may be hexagonal in shape as illustrated in FIG. 2. Thus it can be seen that magnetic sensor 20 may be threadably received in sleeve 32 to extend from a first end 31 thereof. Lock nut 33 is affixed to the threaded exterior 23 of magnetic sensor 20 to retain magnetic sensor 20 in a fixed predetermined relationship with sleeve 32 and form stepped juncture 34 therewith. This fixed predetermined relationship enables magnetic sensor 20 to be threadably received in radial bore 26 with lock nut 33 abutting shoulder 29 while providing the necessary and important air gap 22.

Magnetic sensor 20 has extending from the end opposite tip 21 a pair of electrical conduits 35 and 36 which are adapted to be received by an electronic sensing apparatus exterior of the gas turbine engine. Leads 35 and 36 are protected by a flexible conduit 38 which may be formed of conventional hydraulic hose used in hydraulic systems. Flexible conduit 38 has affixed at either end a fitting 40 also well-known in the art. Fitting 40 proximate magnetic sensor 20 is equipped with a threaded portion 41 which may be threadably received in sleeve 32. After being threadably received in sleeve 32, fitting 40 is retained therein and prevented from rotation relative thereto by a lock device 42 which includes tabs to be bent over flat surfaces on sleeve 32 and the adjacent hexagonal nut 44 integrally formed with fitting 40.

As set forth above, access to socket means 24 is difficult if not impossible in an assembled engine; therefore, utilizing a flexible conduit means requires appropriate guide features to insure the flexible conduit reaches the proper destination when inserted through an aperture in the engine case. Accordingly, the gas turbine is provided with a non-linear rigid conduit 46 which is affixed to turbine housing 10 by appropriate bracket means 47. These bracket means 47 may be of the conventional tubing holder type and affixable to the turbine housing by bolt means such as bolts 48. Rigid conduit 46 may be formed with one or more changes in direction with the inner end of the rigid conduit positioned in the vicinity of frustoconical surface 30 so that passage of flexible conduit 38 through rigid conduit 46 will lead the magnetic sensor 20, sleeve 32 and fitting 40 into socket means 24 and allow magnetic sensor 20 to be threadably received in radial bore 26. Flexible conduit 38 is formed so that rotation thereof rotates magnetic sensor 20 in radial bore 26 and thereby be threadably received by the radial bore. The outer end 52 of rigid conduit 46 may be flared to facilitate reception of flexible conduit 38.

Flexible conduit 38, as previously noted, extends outwardly of rigid conduit 46 to an aperture 49 in turbine casing 16. A special fitting 51 in the form of a flanged cylinder is provided to secure the outer end of the flexible conduit to turbine casing 16. In particular, flanged special fitting 51 is formed with a threaded bore 53 which is adapted to receive a sleeve fitting 54 which itself contains an internal threaded bore 55 formed to receive the threaded portion 43 of the fitting 40 affixed to the outer end of flexible conduit 38. Sleeve fitting 54 when received in bore 53 extends outwardly therefrom and has affixed thereto a nut 56 which in cooperation with fitting 51 retains the outer end of flexible conduit 38 in the vicinity of aperture 49. To prevent rotation of flexible conduit 38 when received in special fitting 51, a radial pin 61 is positioned through an aperture 57 formed in special fitting 51 and extending into a keyway 58 formed in sleeve fitting 54. Special fitting 51 defines around the outer perimeter thereof a groove 59 in which an O-ring seal 60 is disposed to sealingly associate special fitting 51 with aperture 49. A retainer plate 62 is utilized to prevent rotation of special fitting 51 and is removably affixed to casing 16 by bolt means such as bolts 64. A dowel 66 is inserted through an aperture 68 in retainer plate 62 to extend inwardly toward special fitting 51 wherein it may be registered with one of a plurality of notches 70 formed around the perimeter of flange 72 of flanged special fitting 51. It is to be understood that flange 72 has a diameter greater than aperture 49 so that special fitting 51 cannot slip inwardly of the engine.

The operation of the speed sensor disclosed herein should be apparent from the above description. However, to reiterate, rotation of toothed nut 18 influences the magnetic field of a permanent magnet magnetic sensor 20. Such influence of the magnetic field creates a current in the coil affixed about the permanent magnet in the sensor. The induced current is then conducted outwardly through electrical leads 35 and 36 to a conventional sensing device. Installation of the magnetic sensor should also be apparent at this point; however, to review the installation, the magnetic sensor is initially affixed to sleeve 32 to extend outwardly a predetermined distance so that when installed in socket 30, magnetic tip 21 is properly positioned with the predetermined air gap 22. Flexible conduit 38 is then inserted in rigid conduit 46 so that magnetic sensor 20, sleeve 32 and fitting 40 are led inwardly of socket 24. As magnetic sensor 20 reaches the inner end of socket 24, rotation of flexible conduit 38 will cause the magnetic sensor to be threadably received in radial bore 26. Proper placement of lock nut 33 on magnetic sensor 20 insures the proper positioning of tip 21 of magnetic sensor 20 relative shaft 14. When lock nut 33 is in contact with shoulder 29, special fitting 51 may be affixed to the outer end of flexible conduit 38 through the use of sleeve fitting 54 and nut 56. Pin 61 is then inserted in radial aperture 57 into keyway 58 to fix sleeve fitting 54 relative special fitting 51. Retainer plate 62 is then affixed to the outer casing 16 of the gas turbine engine and dowel 66 inserted in aperture 68 and into one of the plurality of notches 70 to prevent rotation of special fitting 51. Thus magnetic sensor 20 may be positioned in the gas turbine engine without access to the immediate vicinity of shaft 14.

Although this specification has been directed toward a specific embodiment, it is to be understood that this specification is not so limited but incorporates those modifications and provisions which are apparent to those well-versed in the art.

What is claimed is:

1. In a gas turbine engine having an output shaft mounted in a casing, the output shaft having a toothed nut mounted thereon, and a magnetic device responsive to rotation of the output shaft for generating a current fluctuating in direct proportion to the speed of rotation of the output shaft, an electromagnetic speed sensor mounting assembly for mounting said magnetic device adjacent said toothed gear comprising:

electrical conduit means interconnected with said magnetic device for conducting the fluctuating current therefrom;

threadably bored fitting means lockingly receiving the magnetic device, said magnetic device partially extending from a first end of the bored fitting means a predetermined distance so that the bored fitting means forms a stopped juncture with the magnetic device, said electrical conductor means extending from the other end thereof;

socket means rigidly associated with the turbine casing in the vicinity of the toothed nut and defining a threaded radial bore relative the shaft and a counterbore extending outwardly therefrom, said counterbore slidably receiving the fitting means allowing the magnetic device to be threadably received in the threaded radial bore;

flexible conduit means removably lockably affixed to the threadably bored fitting means for protecting the electrical conductors and for rotating the fitting means in the socket means.

2. The electromagnetic speed sensor mounting assembly set forth in claim 1 further comprising mounting means associatable with the flexible conduit means and fixable to the turbine casing for fixing the flexible conduit means relative thereto.

3. The speed sensor mounting assembly set forth in claim 2 further comprising rigid guide tube means removably disposed between said socket means and said casing for guiding the flexible conduit means upon insertion in the turbine casing to the socket means.

4. The speed sensing mounting assembly set forth in claim 2 wherein the casing defines a mounting port for receiving the flexible conduit therethrough, whereby the mounting means may be associated with the flexible conduit and affixed to said casing.

5. The speed sensor mounting assembly as set forth in claim 4 further comprising a rigid guide tube means affixed to said casing and disposed between the mounting port and the socket means for guiding the flexible conduit toward the socket means with the flexible conduit inserted through the mounting port.

6. The speed sensor mounting assembly as set forth in claim 5 further comprising lock means for lockingly associating the flexible conduit means with the mounting means for preventing rotation of the flexible conduit means relative the mounting means.

7. The speed sensor mounting assembly as set forth in claim 6 further comprising second locking means for lockingly associating the mounting means with the turbine casing.

8. The speed sensor mounting assembly as set forth in claim 7 wherein the mounting means comprises a retainer plate fixable to the turbine casing, and a cylinder having a flange at one end thereof, said flange being of greater diameter than the aperture in the turbine casing, the flange having defined around the outer perimeter thereof a plurality of notches, the retainer plate defining therein an axially aligned bore, the second locking means comprising a dowel pin insertable in the axially aligned bore of the retainer plate and through a notch in the flange and aligned with said bore for preventing rotation of the flange.

9. The speed sensor mounting assembly as set forth in claim 8 wherein the cylinder defines a peripheral groove, and wherein the engine casing aperture for receiving the flexible conduit means is of generally the same diameter of the cylinder to slidingly receive the cylinder, the assembly further comprising an O-ring seal member disposed in the peripheral groove of the cylinder for sealingly associating the cylinder with the casing.

* * * * *